United States Patent
Goran et al.

(10) Patent No.: US 12,236,534 B1
(45) Date of Patent: Feb. 25, 2025

(54) PROJECTING EXISTING USER-GENERATED CONTENT INTO AN IMMERSIVE VIEW

(71) Applicant: Google LLC, Mountain View, CA (US)

(72) Inventors: Charles Goran, Lafayette, CO (US); Ilies Ghanzouri, Seattle, WA (US); Cardin Everett Moffett, Boulder, CO (US); Julien Benjamin Brette, Santa Clara, CA (US); Santiago David Lopez Lopez, Seva (ES); Marcos Seefelder de Assis Araujo, London (GB); Daniel Joseph Filip, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/444,013

(22) Filed: Feb. 16, 2024

(51) Int. Cl.
*G06T 19/00* (2011.01)
*G01C 21/36* (2006.01)

(52) U.S. Cl.
CPC ........ *G06T 19/003* (2013.01); *G01C 21/3638* (2013.01); *G01C 21/3682* (2013.01); *G06T 2200/24* (2013.01); *G06T 2219/004* (2013.01); *G06T 2219/024* (2013.01)

(58) Field of Classification Search
CPC ........ G06F 16/29; G06F 3/011; G06F 16/954; G06F 16/5866; G06F 3/04815; G06T 19/003; G06T 17/05; G06T 19/006; G06T 2219/004; G06T 2200/24
See application file for complete search history.

(56) References Cited

U.S. PATENT DOCUMENTS

| 2019/0050137 A1* | 2/2019 | Mildrew | G06T 19/003 |
| 2023/0351711 A1* | 11/2023 | Roach | G06T 19/006 |

* cited by examiner

*Primary Examiner* — Hau H Nguyen
(74) *Attorney, Agent, or Firm* — DORITY & MANNING P.A.

(57) ABSTRACT

The present disclosure provides methods, systems, and devices for projecting user-generated media content into three-dimensional immersive views. A system can obtain a three-dimensional representation of a location generated based on a plurality of images. The system can access user-generated media content associated with the location. The system can receive path information representing a path through the three-dimensional representation of the location. The system can select one or more pieces of user-generated media content based on the path information. The system can integrate the one or more pieces of user-generated media content into the three-dimensional representation of the location based on the path information and a portion of the three-dimensional representation to be displayed to a user, wherein the pieces of user-generated media content are presented within visual pop-outs in the three-dimensional representation. The system can provide the three-dimensional representation of the location for display to a user.

18 Claims, 12 Drawing Sheets

720

PROJECTING EXISTING USER-GENERATED CONTENT INTO AN IMMERSIVE VIEW

FIELD

The disclosure relates generally to providing an immersive view of a location. For example, the disclosure relates to methods and systems for integrating existing user generated media content into a three-dimensional immersive representation of a location.

BACKGROUND

Geographic information systems (GIS) enable a wide array of applications, including urban planning, navigation, environmental monitoring, and virtual tourism. With the advent of high-resolution imaging and the ubiquity of location-aware devices, there has been an exponential increase in the volume of user-generated content that can be utilized to enhance the realism and informational value of virtual geographic representations.

However, a significant technical challenge arises from the integration of this user-generated content into 3D geographic models. Specifically, the computational complexity associated with processing, selecting, and rendering high volumes of heterogeneous data into a coherent, navigable 3D environment is substantial. This complexity is further exacerbated when considering the need to maintain real-time interactivity and visual fidelity within these virtual environments.

As a result, there exists a technical problem in the field of computerized geographic information systems: how to efficiently and effectively project user-generated content into an immersive 3D view of a location while addressing the computational complexity inherent in processing, selecting, and rendering this content in real-time. Solving this technical problem would significantly enhance the utility and realism of virtual geographic representations, providing users with a richer and more informative experience when exploring virtual environments.

SUMMARY

Aspects and advantages of embodiments of the disclosure will be set forth in part in the following description, or can be learned from the description, or can be learned through practice of the example embodiments.

In one or more example embodiments, a computer implemented method for updating a three-dimensional representation to include user generated content. The method comprises obtaining a three-dimensional representation of a location, wherein the three-dimensional representation is generated based on a plurality of images. The method comprises accessing user-generated media content associated with the location. The method comprises receiving path information representing at least a portion of a path through the three-dimensional representation of the location. The method comprises selecting one or more pieces of user-generated media content based, at least in part, on the path information. The method comprises integrating the one or more pieces of user-generated media content into the three-dimensional representation of the location based on the path information and a portion of the three-dimensional representation to be displayed to a user, wherein the pieces of user-generated media content are presented within one or more visual pop-outs in the three-dimensional representation. The method comprises providing the three-dimensional representation of the location for display to a user.

Another example aspect of the present disclosure is directed at a computing system. The system can include one or more processors and one or more non-transitory computer-readable media that collectively store instructions that, when executed by the one or more processors, cause the computing system to perform operations. The operations can include obtaining a three-dimensional representation of a location, wherein the three-dimensional representation is generated based on a plurality of images. The operations can include accessing user-generated media content associated with the location. The operations can include receiving path information representing at least a portion of a path through the three-dimensional representation of the location. The operations can include selecting one or more pieces of user-generated media content based, at least in part, on the path information. The operations can include integrating the one or more pieces of user-generated media content into the three-dimensional representation of the location based on the path information and a portion of the three-dimensional representation to be displayed to a user, wherein the pieces of user-generated media content are presented within one or more visual pop-outs in the three-dimensional representation. The operations can include providing the three-dimensional representation of the location for display to a user.

Another example aspect of the present disclosure is directed to one or more non-transitory computer-readable media that collectively store instructions that, when executed by one or more computing devices, cause the one or more computing devices to perform operations. The operations can include obtaining a three-dimensional representation of a location, wherein the three-dimensional representation is generated based on a plurality of images. The operations can include accessing user-generated media content associated with the location. The operations can include receiving path information representing at least a portion of a path through the three-dimensional representation of the location. The operations can include selecting one or more pieces of user-generated media content based, at least in part, on the path information. The operations can include integrating the one or more pieces of user-generated media content into the three-dimensional representation of the location based on the path information and a portion of the three-dimensional representation to be displayed to a user, wherein the pieces of user-generated media content are presented within one or more visual pop-outs in the three-dimensional representation. The operations can include providing the three-dimensional representation of the location for display to a user.

These and other features, aspects, and advantages of various embodiments of the disclosure will become better understood with reference to the following description, drawings, and appended claims. The accompanying drawings, which are incorporated in and constitute a part of this specification, illustrate example embodiments of the disclosure and, together with the description, serve to explain the related principles.

BRIEF DESCRIPTION OF THE DRAWINGS

Detailed discussion of example embodiments directed to one of ordinary skill in the art is set forth in the specification, which makes reference to the appended drawings, in which.

DETAILED DESCRIPTION

Figure 1:
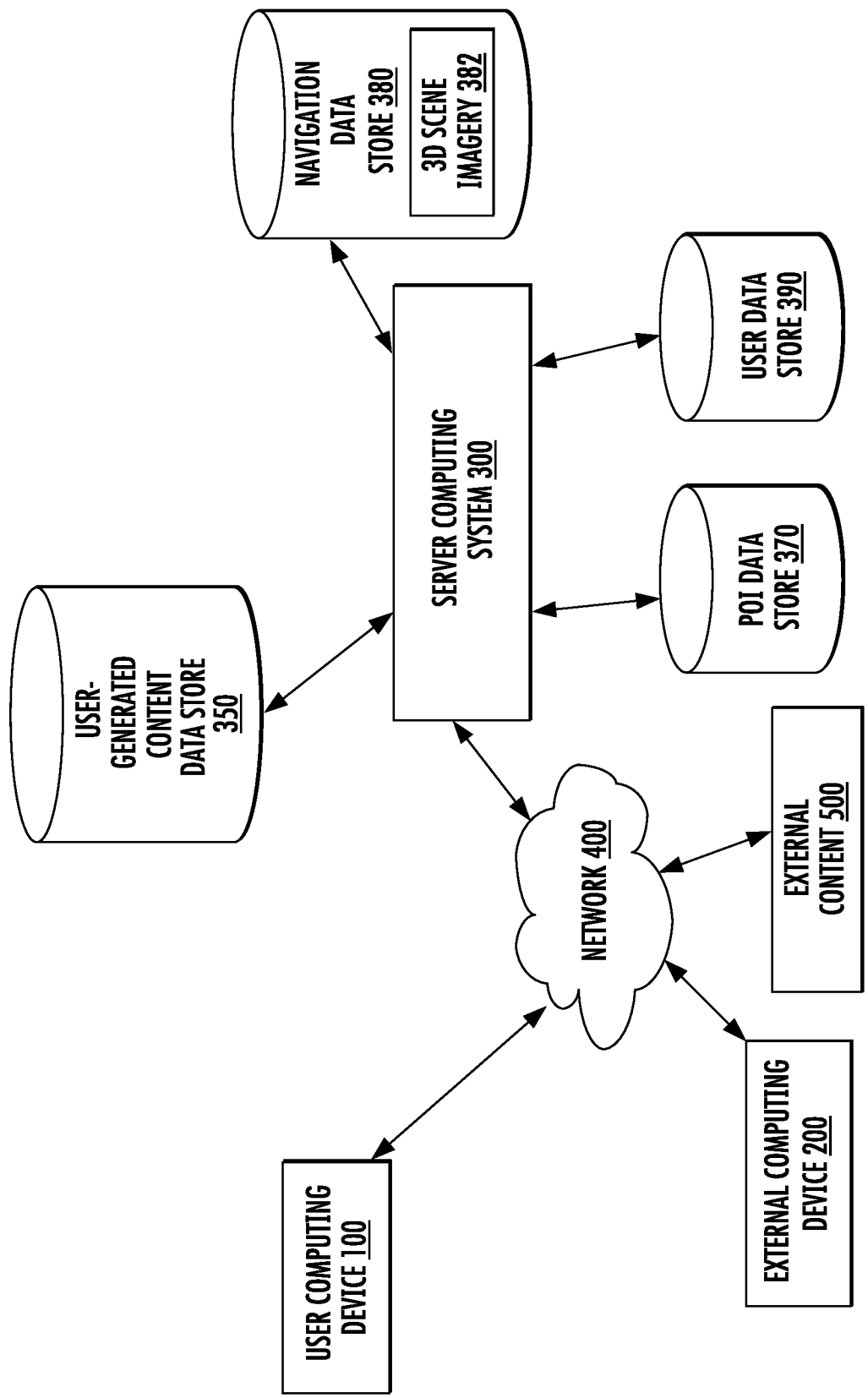
FIG. 1 is an example system according to one or more example embodiments of the disclosure.

Reference now will be made to embodiments of the disclosure, one or more examples of which are illustrated in the drawings, wherein like reference characters denote like elements. Each example is provided by way of explanation of the disclosure and is not intended to limit the disclosure. In fact, it will be apparent to those skilled in the art that various modifications and variations can be made to disclosure without departing from the scope or spirit of the disclosure. For instance, features illustrated or described as part of one embodiment can be used with another embodiment to yield a still further embodiment. Thus, it is intended that the disclosure covers such modifications and variations as come within the scope of the appended claims and their equivalents.

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The present disclosure is directed to systems and methods for integrating (e.g., embedding) user-generated media content within a three-dimensional (3D) representation of a location. More specifically, when a user chooses to view an immersive three-dimensional representation of a location, a representation modification system can select one or more pieces of user-generated media content to be integrated into the immersive three-dimensional representation of the location. One or more pieces of user-generated media content can be selected based on one or more of: particular categories of media content, a particular subject or topic, the location associated with a specific three-dimensional representation (or a portion thereof), the subjects included in the piece of media content, the ratings of the piece of user-generated media content, and so on.

The selected pieces of user-generated media content can be inserted into the three-dimensional representation of the location. In some examples, the pieces of user-generated media content can be displayed along a path through the three-dimensional representation of a scene in one or more visual pop-outs. Each visual pop-out can be displayed at a particular portion of the three-dimensional representation, such that the piece of user-generated media content is displayed within the three-dimensional representation. A user can select a particular pop-out to receive a more detailed version of the piece of user-generated visual media.

For example, the three-dimensional representation of the location can be of a restaurant. When a user initiates viewing the three-dimensional representation of the location, the display system can determine one or more user-generated media content pieces to display in one or more pop-outs in the three-dimensional representation of the location. These pieces of user-generated content can be selected based on the specific position in the three-dimensional space with which the respective pieces of user-generated media content are associated and/or based on the content of the pieces of user-generated media content. Each pop-out can be populated with a single piece of user-generated media content (e.g., images, videos, or audio).

The view presented to the user of the three-dimensional representation can be controlled such that it travels through the three-dimensional representation along a particular path. As the display follows a path through the three-dimensional representation, a plurality of visual pop-outs can be displayed. The user can select a respective pop-out (e.g., by clicking on the pop-out in the user interface). In response, the user interface can be updated to present a larger and more detailed view of the piece of user-generated media content. In some examples, the user-generated content can provide the user with information about: the location under specified conditions (e.g., a particular time, a particular weather condition, etc.), the number of people at the location (e.g., crowded, empty, etc.), a state of the atmosphere generally (e.g., vibrant and lively, subdued, etc.), an expected attire (e.g., formal wear, trendy, casual, sports attire, etc.), a noise level (e.g., peaceful, rowdy, etc.), and so on.

More generally, the present disclosure is directed to systems and methods for integrating (e.g., embedding) user-generated media content with a three-dimensional (3D) representation of a location. The systems and methods can be performed by an application on a user computing device, a remote server system, or a combination of both. A server computing system can be any computing system configured to communicate with a user computing device (or other computing devices) over a network to provide information or a service. If a server computing system is employed, the server computing system can receive, from a user computing device, a request to view a three-dimensional representation of a location. Data describing the three-dimensional representation can be transmitted to the user computing device for display to a user through an application on the user computing device.

A user computing device can be any computing device designed to be operated by an end-user. For example, a user computing device can include but is not limited to a personal computer, a smartphone, a smartwatch, a fitness band, a tablet computer, a laptop computer, a hand-held navigation computing device, a wearable computing device, a game console, and so on. In some examples, a user computing device can include one or more communication systems that can communicate with a server system through a communication network.

A navigation and mapping system may include an immersive view application to provide a user of a computing device a way to explore a location through multi-dimensional views of an area or point of interest, including landmarks, restaurants, stores, and the like. The immersive view application may be part of a navigation application, a separate mapping application, or a standalone one. The immersive view application can receive a plurality of images of a particular location or point of interest. In some examples, the plurality of images are generated specifically for the immersive view application. In this case, the plurality of images are generated (or captured) by a user moving through the location and periodically capturing images (e.g., one image a second). In other examples, the plurality of images can be sourced from already existing images of the area. These existing images can be filtered to identify the most valuable images for generating a three-dimensional representation of a scene.

The plurality of images can be provided to a machine-learned model trained to generate three-dimensional representations of locations based on a plurality of images. For example, the machine-learned model can use a neural radiance field process for generating the three-dimensional representation for a location based on a plurality of images. The machine-learned model can output the three-dimensional representation of the location. The three-dimensional representation of a location can display an immersive view of a scene associated with the location. The contents of the displayed immersive view can depend on the location and direction of a viewing object (e.g., a simulated camera positioned within the three-dimensional representation).

The viewing object can be moved throughout the three-dimensional representation to view different portions of the scene and aspects of the location from different angles. In some examples, the movement of the viewing object can be predetermined based on one or more predetermined tracks or paths throughout the three-dimensional space. These predefined paths may be determined based on the path of the user who generated the images used to create the three-dimensional representation of the location. In other examples, the three-dimensional representation can be flexible such that the viewing object can move according to a user's input.

In some examples, the three-dimensional representation can be augmented with additional media content to provide additional information to the users while viewing the three-dimensional representation. For example, the three-dimensional representation can include only the fixed or static (e.g., permanent or semi-permanent) features of the location. As a result, information associated with movable objects or transient phenomena such as people, food, and ambiance, including lighting and mood, may not be represented in the three-dimensional representation. This additional information can be provided through user-generated media content, inserted into the 3D representation as a series of two-dimensional pop-outs or visual data display windows positioned throughout the 3D representation.

User-generated media content can include images, video, and audio captured by users and made available to the representation generation system. For example, the users can post this information to a publicly available social media site and indicate that it is available to generate three-dimensional representations of a location. Thus, user-generated content will only be used with the express permission of the users.

The user-generated media content can provide information about the non-permanent aspects or features of the location. This information can include a general sense of the ambiance or vibe of the location, the services and foods provided there, seasonal decorations, the estimated density of people at that location at certain times, and so on.

The representation generation system can determine the number and type of user-generated media content to display in one or more pop-outs in the representation. The representation generation system can determine the number of pop-outs to display in the representation based on a number of factors. For example, the representation generation system can determine the total size of the 3D representation of the location. For example, the representation generation system can determine a path through the representation. The representation path can be determined based on the user's path when initially capturing the images used to generate the representation. In other examples, the user can choose their path through the representation, which could be used as the total length of the user's path.

The representation generation system can determine the density of the visual pop-outs to be displayed in the representation of the location. In some examples, the density can be based on the degree to which pop-outs are essential for the user to understand one or more non-fixed features of the location. For example, if the representation has many objects, the density may be less than a representation with fewer objects in the original display. In some instances, the estimated speed of a camera through the location can also be used to determine the density of pop-outs. For example, if the camera associated with the user is moving slower, the density of the popups can be greater and vice versa. The generation representation system can determine the number of pop-outs to display based on one or more factors.

In some examples, the representation generation system can determine the location of the pop-out based on the existing features in a three-dimensional representation of the location. For example, specific features of the representation may be selected as anger points for the pop-outs. In other examples, the locations for the popups can be determined based on the locations of the most highly rated pieces of user-generated media content.

For example, each piece of user-generated media content can have an associated location. That associated location can be mapped into the representation of the location to determine where, in the representation, the media content can be viewed. In some examples, the representation generation system can select which pieces of media user-generated media content to display based on one or more subjects determined to be relevant to the representation of the location. For example, for particular locations such as restaurants, the subjects of interest may be one of: ambience, mood, vibe, food, activities and so on. The subjects of interest may differ for other locations, such as a mini golf course. For example, the subjects of interest for mini-golf courses may include the density of users, the general weather, and the vibe of the general clientele, which may be of more interest.

In some examples, specific pieces of user-generated media content can be selected based on their associated locations. For example, the representation generation system can determine that a particular location in the representation is favorable for a pop-out. Based on this determination, the three-representation modification system can select the highest-rated piece of content associated with that location. Similarly, suppose two highly rated pieces of user-generated content are close to each other. In that case, the representation generation system may only include one so that two pop-outs are not displayed too closely in the representation of the location.

In some examples, the selected pieces of user-generated content are chosen based on the time the piece of user-generated content was captured. For example, the user may select a particular time (e.g., 6:30 PM), date (Friday night), or both (e.g., a specific date with a particular time) when choosing to view the three-dimensional representation of the location. Based on the user-selected time and/or date, the representation generation system can select user-generated content to insert into the three-dimensional representation of the location at the selected time/date. For example, suppose a particular restaurant opens a space for a dance floor after 10:00 PM on Friday. In that case, the pieces of user-generated content that are displayed for 10:30 PM Friday can include an indication of the dance floor and the expected ambience that accompanies it. Similarly, before that time, the selected pieces of user-generated media content will not be associated with the dance floor.

In some examples, the user can select a specific date or time of the year (e.g., holidays or other significant dates or times of the year) and the representation modification system can select pieces of user-generated media content that is appropriate for that date or time of the year. For example, the user can see examples of the ambiance or decorations that can be expected at a particular location during the winter holiday time or the vibe of a pool available at a resort during the summer months.

Once the representation modification system has determined the number of pieces of media content, the locations of the pieces of media content, the subject of interest for the pieces of user-generated media content, and the time/date that the user is interested in, the representation modification system can filter the candidate pieces of user-generated media content based on the specified criteria. Once the pieces of user-generated media content have been filtered, the representation modification system can select one or more pieces of user-generated media content with the highest rating.

In some examples, the user-generated media content can be rated based on the degree to which it matches a particular set of criteria, including subject, place, time, etc. In some examples, the ratings are generated by a third-party rating service. In some examples, the representation modification system can create the rating.

In some examples, a representation modification system can modify the selected piece of user-generated media content. For example, images can be cropped, and videos can be edited. In some examples, particular details may be edited out, or certain features can be highlighted. In some examples, text associated with user-generated media content can also be displayed.

In some examples, the selected images can be inserted into the three-dimensional representation of the location as visual pop-outs. A visual pop-outs can be displayed within the three-dimensional representation such that users can view them as they navigate through the three-dimensional representation of a location. For example, an application installed on the user's computing device can present a three-dimensional presentation of the location to the user. The visual pop-outs can be two-dimensional images displayed in the context of a particular location with the three-dimensional representation. The visual popouts can include a border (e.g., a white or black border) to distinguish them from the other portions of the three-dimensional representation. In addition, each visual pop-out can be associated with a particular location within the three-dimensional representation and can have a visual tail that connects the border to a particular location within the three-dimensional representation.

While navigating through the three-dimensional representation of the location, the user can interact with or select one or more pop-outs to obtain more detail about the user-generated content. For example, if a user clicks on a particular piece of user-generated visual content, the interface can be updated with a larger version of that piece of user-generated content for the user to view.

According to examples of the disclosure, a server computing system may provide the three-dimensional representation of a location to a computing device for presentation on a display device of the computing device. The three-dimensional representation of the location may be provided dynamically (e.g., generated and transmitted in response to a request from the computing device), or the three-dimensional representation of the location may be provided by retrieving the three-dimensional representation of the location from a database. The integrated three-dimensional scene of the location may be retrieved from the database according to the conditions of the request.

Thus, the present disclosure provides techniques that address the computational complexity associated with processing, selecting, and rendering high volumes of heterogeneous user-generated data in real-time into a coherent and navigable 3D environment. The technical solution involves a computer-implemented method that includes obtaining a 3D representation of a location based on a plurality of images, accessing associated user-generated media content, receiving path information through the 3D representation, selecting content based on this path information, and integrating the content into the 3D representation where it is presented within visual pop-outs. Specific technical implementations include the use of machine-learned models to generate the 3D representation, determining the path through the representation based on user input or predefined routes, and/or selecting user-generated content that aligns with the path and enhances the understanding of non-permanent aspects of the location.

One or more technical benefits of the solutions described herein include allowing users to easily and more accurately obtain an accurate representation of a state of a location under particular circumstances or conditions. For example, a user can easily and more accurately obtain an accurate representation of the state of an indoor or outdoor venue, including a restaurant or park at a particular time of day, time of year, etc. For example, a user can easily and more accurately obtain an accurate representation of the state of an indoor or outdoor venue, including a restaurant or park, under certain environmental conditions (e.g., when it is sunny, when it is rainy, when it is windy, etc.). Due to the above methods, users are provided with an accurate representation of the state of a location, virtually and via a display, without needing to travel to the location in person. Further, the user may also be provided with an accurate prediction of the state of a location at a certain time or under certain conditions, as defined by the user.

One or more technical benefits of the solutions described herein also include integrating fresh media content (e.g., user-generated media content) associated with a location with a preexisting three-dimensional representation of a location. For example, the media content may be obtained subsequent to imagery, which is used to form the three-dimensional representation of the location. Therefore, the three-dimensional representation with integrated pieces of user-generated media content represents an accurate and updated state of the location. Furthermore, various distinct three-dimensional representations may be generated to accurately portray the location according to various conditions. For example, the server computing system is configured to select pieces of user-generated media content for integration based on information associated with the media content that matches the request of the user for an immersive view. For example, images of the interior of a restaurant taken in the morning when few customers are present would not be integrated into an integrated 3D scene, which is generated for an immersive view of the restaurant at dinner. Therefore, metadata and other descriptive content associated with the media content may be used to accurately form the three-dimensional representation of the location. Likewise, image segmentation techniques and machine learning resources may be implemented to position or place dynamic objects extracted from media content in suitable locations within the three-dimensional representation of the location to accurately provide a state of the location.

Thus, aspects of the proposed systems and methods represent a technical solution to the technical problem of augmenting existing three-dimensional representations of the static contents of a location with data to represent the dynamic aspects of a location. This system introduces a novel way of selecting user-generated media content for integrating into existing three-dimensional representations to represent the non-static aspects of the location to allow a user to understand the vibe and/or ambiance of the location with minimal additional cost and time. Thus, it solves the problem of presenting dynamic data to users when displaying a three-dimensional representations that include the static elements of a location.

FIG. 1 is an example system according to one or more example embodiments of the disclosure. FIG. 1 illustrates an example of a system that includes a user computing device 100, an external computing device 200, a server computing system 300, and external content 500, which may communicate with one another over a network 400. For example, the user computing device 100 and the external computing device 200 can include any of: a personal computer, a smartphone, a tablet computer, a global positioning service device, a smartwatch, and the like. The network 400 may include any type of communications network, including a wired or wireless network, or a combination thereof. The network 400 may include a local area network (LAN), wireless local area network (WLAN), wide area network (WAN), personal area network (PAN), virtual private network (VPN), or the like. For example, wireless communication between elements of the example embodiments may be performed via a wireless LAN, Wi-Fi, Bluetooth, ZigBee, Wi-Fi direct (WFD), ultra-wideband (UWB), infrared data association (IrDA), Bluetooth low energy (BLE), near field communication (NFC), a radio frequency (RF) signal, and the like. For example, wired communication between elements of the example embodiments may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

As will be explained in more detail below, in some implementations, the user computing device 100 and/or server computing system 300 may form part of a navigation and mapping system that can provide an immersive view of a location to a user of the user computing device 100.

In some example embodiments, the server computing system 300 may obtain data from one or more of a user-generated content data store 350, a POI data store 370, a navigation data store 380, and a user data store 390, to implement various operations and aspects of the navigation and mapping system as disclosed herein. The user-generated content data store 350, POI data store 370, navigation data store 380, and user data store 390 may be integrally provided with the server computing system 300 (e.g., as part of the one or more memory devices 320 of the server computing system 300) or may be separately (e.g., remotely) provided. Further, user-generated content data store 350, POI data store 370, navigation data store 380, and user data store 390 can be combined as a single data store (database) or may be a plurality of respective data stores. Data stored in one data store (e.g., the POI data store 370) may overlap with some data stored in another data store (e.g., the navigation data store 380). In some implementations, one data store may reference data that is stored in another data store (e.g., the user-generated content data store 350).

User-generated content data store 350 can store media content captured by a user, for example, via user computing device 100, external computing device 200, or some other computing device. The user-generated media content may include user-generated images, videos, and/or user-generated audio content. For example, the media content may be captured by a person operating a user computing device (e.g., a smartphone) or may be captured indirectly, for example, by a computing system that monitors a location (e.g., a security system, surveillance system, and the like).

For example, the user generated media content may be captured by a camera (e.g., image capturer 182 in FIG. 2) of a computing device, and may include imagery of a location, including a restaurant, a landmark, a business, a school, and the like. The imagery may include various information (e.g., metadata, semantic data, etc.) useful for integrating the imagery (or portions of the imagery) in a three-dimensional representation of a location associated with the imagery. For example, an image may include information including the date the image was captured, the time of day the image was captured, location information indicating the location where the image was taken (e.g., a GPS location), etc. For example, descriptive metadata may be provided with the image and may include keywords relating to the image, a title or name of the image, environmental information at the time the image was captured (e.g., lighting conditions including a luminance level, noise conditions including a decibel level, weather information including weather conditions including temperature, wind, precipitation, cloudiness, humidity, etc.), and the like. The environmental information may be obtained from sensors of the computing device used to capture the image or from another computing device.

For example, the user-generated media content may be captured by a microphone (e.g., sound capturer 184) of a user computing device and may include audio associated with a location, including a restaurant, a landmark, a business, a school, and the like. The audio content may include information including a date the audio was captured, a time of day the audio was captured, and location information indicating the location where the audio was captured (e.g., a GPS location), etc. For example, descriptive metadata may be provided with the audio and may include keywords relating to the audio, a title or name of the audio, environmental information at the time the audio was captured (e.g., lighting conditions including a luminance level, noise conditions including a decibel level, weather information including weather conditions including temperature, wind, precipitation, cloudiness, humidity, etc.), and the like. The environmental information may be obtained from sensors of the computing device used to capture the audio or from another computing device.

POI data store 370 can store information about locations or points of interest, for example, for points of interest in an area or region associated with one or more geographic areas. A point of interest may include any destination or place. For example, a point of interest may include a restaurant, museum, sporting venue, concert hall, amusement park, school, place of business, grocery store, gas station, theater, shopping mall, lodging, etc. Point of interest data, stored in the POI data store 370, may include any information associated with the POI. For example, the POI data store 370 may include location information for the POI, hours of operation for the POI, a phone number for the POI, reviews concerning the POI, financial information associated with the POI (e.g., the average cost for a service provided and/or goods sold at the POI such as a meal, a ticket, a room, etc.), environmental information concerning the POI (e.g., a noise level, an ambiance description, a traffic level, etc., which may be provided or available in real-time by various sensors located at the POI), a description of the types of services provided and/or goods sold, languages spoken at the POI, a URL for the POI, image content associated with the POI, etc. For example, information about the POI may be obtainable from external content 500 (e.g., from webpages associated with the POI or from sensors disposed at the POI).

Navigation data store 380 may store or provide map data/geospatial data to be used by server computing system 300. Example geospatial data includes geographic imagery (e.g., digital maps, satellite images, aerial photographs, street-level photographs, synthetic models, etc.), tables, vector data (e.g., vector representations of roads, parcels, buildings, etc.), point of interest data, or other suitable geospatial data associated with one or more geographic areas. In some examples, the map data can include a series of sub-maps, each sub-map including loading data for a geographic area including objects (e.g., buildings or other static features), paths of travel (e.g., roads, highways, public transportation lines, walking paths, and so on), and other features of interest.

Navigation data store 380 can be used by server computing system 300 to provide navigational directions, perform point of interest searches, provide point of interest location or categorization data, determine distances, routes, or travel times between locations, or any other suitable use or task required or beneficial for performing operations of the example embodiments as disclosed herein.

For example, the navigation data store 380 may store 3D scene imagery 382, which includes images associated with generating 3D scenes of various locations. For example, a three-dimensional representation generator 336 may be configured to generate a three-dimensional representation based on a plurality of images of a location (e.g., of the inside of a restaurant, of a park, etc.). The plurality of images may be captured and combined using machine-learned models (or other methods) to create a 3D representation of the location. For example, the three-dimensional representation generator 336 can use a neural radiance field method to create a 3D representation model. In some implementations, a method including a structure from a motion algorithm can be used to estimate a three-dimensional structure. In some implementations, a machine learning resource may be implemented to generate a camera-like image from any viewpoint within the location based on the captured images. For example, video flythroughs of the location may be generated based on the captured images. In some implementations, the initial three-dimensional representation generated by the three-dimensional representation generator 336 may be a static 3D scene devoid of variable or dynamic (e.g., moving) objects. For example, the initial 3D scene of a park may include imagery of the park, including imagery of trees, playground equipment, picnic tables, and the like, without imagery of humans, dogs, or non-static objects. User-generated content may include imagery of the variable or dynamic objects, where the imagery may be associated with different times and/or conditions (e.g., different times of the day, week, or year, different lighting conditions, different environmental conditions, etc.).

For example, the navigation data store 380 may store integrated 3D scene imagery 384, which includes 3D scenes of various locations with which user-generated media content is integrated. In an example, a representation modification system 338 may be configured to integrate user-generated content from user-generated content data store 350 with a three-dimensional representation obtained from 3D scene imagery 382. For example, the integrated 3D scene imagery 382 may include 3D scenes of various locations with which user-generated media content is integrated. The 3D scene generated based on the plurality of images of the location may be integrated with the media content using known methods to create the integrated 3D scene imagery 384 of the location. For example, the representation modification system 338 may be configured to identify and extract one or more objects (e.g., one or more dynamic objects) from an image of a scene.

For example, the representation modification system 338 may be configured to position or place one or more selected user-generated media content within a three-dimensional representation that is associated with the user-generated media content. For example, the representation modification system 338 may select a piece of user-generated media content from a database of user-generated media content (e.g., the user-generated media data store 342 in FIG. 3) which corresponds to the three-dimensional representation requested by a user. For example, the representation modification system 338 may select a piece of user generated content from a plurality of pieces of user-generated content from the data (e.g., user-generated media data store 342) which has the greatest degree of similarity to the user request (e.g., in terms of a time of day, time of year, weather conditions, lighting conditions, etc.). For example, a user-generated image taken at a park at noon in sunny conditions may include several people playing on playground equipment. The representation modification system 338 may be configured to extract the children from the image using various techniques (e.g., image segmentation algorithms, machine learning resources, cropping tools, etc.). The representation modification system 338 may be configured to select a piece of user-generated media content 3D from a database having features similar to the image (e.g., a similar time of day, time of year, sunny conditions, etc.). The representation modification system 338 may be configured to position the images of the people within visual pop-outs to generate an updated or integrated three-dimensional representation in which images of the people are placed in the scene (e.g., on or near a slide, on or near a see saw, etc.), so as to provide a user viewing the integrated three-dimensional representation with an accurate representation of the state of the park at that time of day, as well as a sense of how the park generally feels at that time of day, for example in similar weather conditions.

Media content including user-generated content and/or machine-generated content may include audio content and/or imagery of variable or dynamic objects, where the audio content and imagery may be associated with different times and/or conditions (e.g., different times of the day, week, or year, different lighting conditions, different environmental conditions, etc.). The representation modification system 338 may be configured to integrate the user-generated content and/or machine-generated content with the initial three-dimensional representation generated by three-dimensional representation generator 336, for example, according to temporal information associated with the media content. For example, a first integrated three-dimensional representation of a location may be associated with a first time (e.g., a first time of day, first time of year, etc.) based on media content captured at the first time or relating to the first time and a second integrated three-dimensional representation of the location may be associated with a second time (e.g., a second time of day, second time of year, etc.) based on media content captured at the second time or relating to the second time.

In some example embodiments, the user data store 390 can represent a single database. In some embodiments, the user data store 390 represents a plurality of different databases accessible to the server computing system 300. In some examples, the user data store 390 can include a current user position and heading data. In some examples, the user data store 390 can include information regarding one or more user profiles, including a variety of user data such as user preference data, user demographic data, user calendar data, user social network data, user historical travel data, and the like. For example, the user data store 390 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a user account. According to one or more examples of the disclosure, the data can be analyzed to determine preferences of the user with respect to a POI, for example, to automatically suggest or automatically provide an immersive view of a location that is preferred by the user, where the immersive view is associated with a time that is also preferred by the user (e.g., providing an immersive view of a park in the evening where the user data indicates the park is a favorite POI of the user and that the user visits the park most often during the evening). The data can be analyzed to determine preferences of the user with respect to a POI, for example, to determine preferences of the user with respect to traveling (e.g., a mode of transportation, an allowable time for traveling, etc.), to determine possible recommendations for POIs for the user, to determine possible travel routes and modes of transportation for the user to a POI, and the like.

The user data store 390 is provided to illustrate potential data that could be analyzed, in some embodiments, by the server computing system 300 to identify user preferences, to recommend POIs, to determine possible travel routes to a POI, to determine modes of transportation to be used to travel to a POI, to determine immersive views of locations to provide to a computing device associated with the user, etc. However, such user data may not be collected, used, or analyzed unless the user has consented after being informed of what data is collected and how such data is used. Further, in some embodiments, the user can be provided with a tool (e.g., in a navigation application or via a user account) to revoke or modify the scope of permissions. In addition, certain information or data can be treated in one or more ways before it is stored or used, so that personally identifiable information is removed or stored in an encrypted fashion. Thus, particular user information stored in the user data store 390 may or may not be accessible to the server computing system 300 based on permissions given by the user, or such data may not be stored in the user data store 390 at all.

External content 500 can be any form of external content including news articles, webpages, video files, audio files, written descriptions, ratings, game content, social media content, photographs, commercial offers, transportation method, weather conditions, sensor data obtained by various sensors, or other suitable external content. The user computing device 100, external computing device 200, and server computing system 300 can access external content 500 over network 400. External content 500 can be searched by the user computing device 100, the external computing device 200, and the server computing system 300 according to known searching methods and search results can be ranked according to relevance, popularity, or other suitable attributes, including location-specific filtering or promotion.

Figure 2:
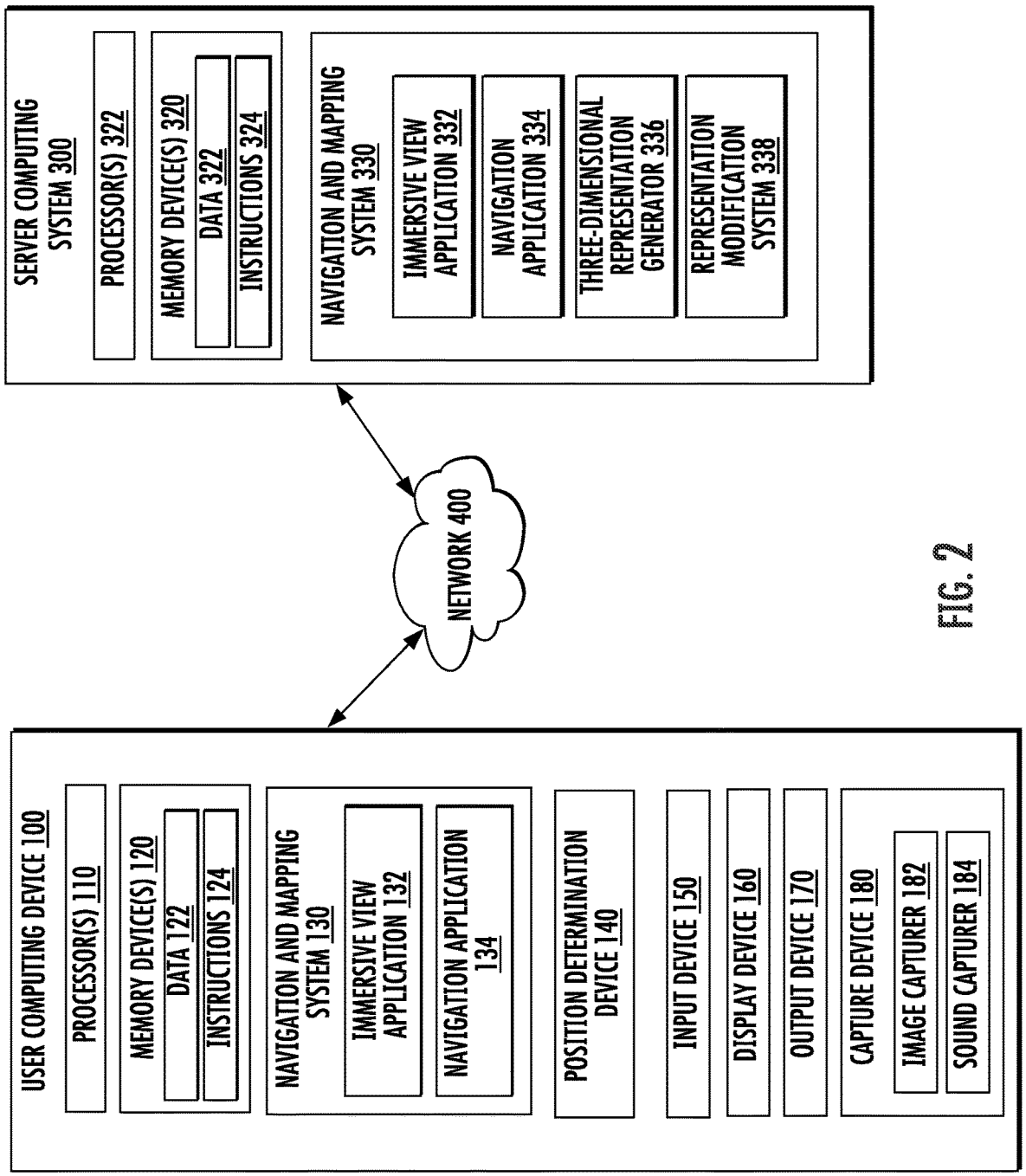
FIG. 2 includes example block diagrams of a computing device and server computing system according to one or more example embodiments of the disclosure.

FIG. 2 includes example block diagrams of a computing device and server computing system according to one or more example embodiments of the disclosure. Although user computing device 100 is represented in FIG. 2, features of the user computing device 100 described herein are also applicable to the external computing device 200.

The user computing device 100 may include one or more processors 110, one or more memory devices 120, a navigation and mapping system 130, a position determination device 140, an input device 150, a display device 160, an output device 170, and a capture device 180. The server computing system 300 may include one or more processors 322, one or more memory devices 320, and a navigation and mapping system 330.

For example, the one or more processors 110 can be any suitable processing device that can be included in a user computing device 100 or server computing system 300. For example, the one or more processors 110 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110 can be a single processor or a plurality of processors that are operatively connected, for example in parallel.

The one or more memory devices 120 can include one or more non-transitory computer-readable storage mediums, including a Read Only Memory (ROM), Programmable Read Only Memory (PROM), Erasable Programmable Read Only Memory (EPROM), flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 120 are not limited to the above description, and the one or more memory devices 120 may be realized by other various devices and structures as would be understood by those skilled in the art.

For example, the one or more memory devices 120 can store instructions 324 that, when executed, cause the one or more processors 110 to execute an immersive view application 132 and to execute the instructions 324 to perform operations including: receiving a first input via the input device 150 requesting a first immersive view of a location which represents a first state of the location at a first time, and providing, for presentation on the display device 160, the first immersive view of the location which includes: a three-dimensional (3D) representation of the location generated based on a plurality of images, and one or more pieces of user-generated media content included in visual pop-outs within the three-dimensional representation of the location. The one or more pieces of user-generated media content can provide additional information to the user about the state of the location, or one or more qualities associated with it (e.g., the vibe of the location).

One or more memory devices 120 can also include data 122 and instructions 124 that can be retrieved, manipulated, created, or stored by the one or more processors 110. In some example embodiments, such data can be accessed and used as input to implement immersive view application 132 and to execute the instructions to perform operations including: receiving a first input via the input device 150 requesting a first immersive view of a location which represents a first state of the location at a first time, and providing, for presentation on the display device 160, the first immersive view of the location which includes: a three-dimensional (3D) scene of the location generated based on a plurality of images, and first media content integrated with the 3D scene of the location, the first media content being representative of the first state of the location at the first time. The operations may further include receiving a second input via the input device 150 requesting a second immersive view of the location which represents a second state of the location at a second time, and providing, for presentation on the display device 160, the second immersive view of the location which includes: the 3D scene of the location generated based on the plurality of images, and second media content integrated with the 3D scene of the location, the second media content being representative of the second state of the location at the second time, as described according to examples of the disclosure.

In some example embodiments, the user computing device 100 includes a navigation and mapping system 130. For example, the navigation and mapping system 130 may include an immersive view application 132 and a navigation application 134.

According to examples of the disclosure, the immersive view application 132 may be executed by the user computing device 100 to provide a user of the user computing device 100 a way to explore a location through multi-dimensional views of an area or point of interest including landmarks, restaurants, and the like. In some implementations, the immersive view application 132 may provide a video flythrough of a location to provide a user an inside view of a location. The immersive view application 132 may be part of navigation application 134, a separate mapping application, or a standalone application.

In some examples, one or more aspects of the immersive view application 132 may be implemented by the immersive view application 332 of the server computing system 300 which may be remotely located, to provide a requested immersive view. In some examples, one or more aspects of the immersive view application 332 may be implemented by the immersive view application 132 of the user computing device 100, to generate a requested immersive view.

According to examples of the disclosure, the navigation application 134 may be executed by the user computing device 100 to provide a user of the user computing device 100 a way to navigate to a location. The navigation application 134 can provide navigation services to a user. In some examples, the navigation application 134 can facilitate a user's access to a server computing system 300 that provides navigation services. In some example embodiments, the navigation services include providing directions to a specific location, such as a POI. For example, a user can input a destination location (e.g., an address or a name of a POI). In response, the navigation application 134 can provide navigation information allowing the user to navigate to the destination location using locally stored map data for a specific geographic area and/or map data provided via the server computing system 300. For example, the navigation information can include turn-by-turn directions from a current location (or a provided origin point or departure location) to the destination location. For example, the navigation information can include a travel time (e.g., estimated or predicted travel time) from a current location (or a provided origin point or departure location) to the destination location.

The navigation application 134 can visually depict a geographic area via a display device 160 of the user computing device 100. The visual depiction of the geographic area may include one or more streets, one or more points of interest (including buildings, landmarks, and so on), and a highlighted depiction of a planned route. In some examples, the navigation application 134 can also provide location-based search options to identify one or more searchable points of interest within a given geographic area. In some examples, the navigation application 134 can include a local copy of the relevant map data. In other examples, the navigation application 134 may access information at server computing system 300, which may be remotely located, to provide the requested navigation services.

In some examples, the navigation application 134 can be a dedicated application specifically designed to provide navigation services. In other examples, the navigation application 134 can be a general application (e.g., a web browser) and can provide access to a variety of different services, including navigation services via the network 400.

In some example embodiments, the user computing device 100 includes a position determination device 140. Position determination device 140 can determine a current geographic location of the user computing device 100 and communicate such geographic location to server computing system 300 over network 400. The position determination device 140 can be any device or circuitry for analyzing the position of the user computing device 100. For example, the position determination device 140 can determine actual or relative position by using a satellite navigation positioning system (e.g., a GPS, a Galileo positioning system, the GLObal Navigation Satellite System (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining a position of the user computing device 100.

The user computing device 100 may include an input device 150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), an output sound device (e.g., a speaker), a trackball, a remote controller, a portable (e.g., a cellular or smart) phone, a tablet PC, a pedal or footswitch, a virtual-reality device, and so on. The input device 150 may further include a haptic device to provide haptic feedback to a user. The input device 150 may also be embodied by a touch-sensitive display having a touchscreen capability, for example. For example, the input device 150 may be configured to receive an input from a user associated with the input device 150.

The user computing device 100 may include a display device 160, which displays information viewable by the user (e.g., a map, an immersive view of a location, a user interface screen, etc.). For example, the display device 160 may be a non-touch-sensitive display or a touch-sensitive display. The display device 160 may include a liquid crystal display (LCD), a light emitting diode (LED) display, an organic light emitting diode (OLED) display, an active matrix organic light emitting diode (AMOLED), flexible display, a 3D display, a plasma display panel (PDP), a cathode ray tube (CRT) display, and the like, for example. However, the disclosure is not limited to these example displays and may include other types of displays. The display device 160 can be used by the navigation and mapping system 130 installed on the user computing device 100 to display information to a user relating to an input (e.g., information relating to a location of interest to the user, a user interface screen having user interface elements which are selectable by the user, etc.). Navigational information can include, but is not limited to, one or more of a map of a geographic area, an immersive view of a location (e.g., a three-dimensional immersive view, a fly through immersive view of a location, etc.), the position of the user computing device 100 in the geographic area, a route through the geographic area designated on the map, one or more navigational directions (e.g., turn-by-turn directions through the geographic area), travel time for the route through the geographic area (e.g., from the position of the user computing device 100 to a POI), and one or more points-of-interest within the geographic area.

The user computing device 100 may include an output device 170 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like. According to various examples of the disclosure, the output device 170 may include a speaker that outputs sound associated with a location in response to a user requesting an immersive view of a location.

The user computing device 100 may include a capture device 180 that is capable of capturing media content, according to various examples of the disclosure. For example, the capture device 180 can include an image capturer 182 (e.g., a camera) configured to capture images (e.g., photos, video, and the like) of a location. For example, the capture device 180 can include a sound capturer 184 (e.g., a microphone) which is configured to capture sound or audio (e.g., an audio recording) of a location. The media content captured by the capture device 180 may be transmitted to one or more of the server computing system 300, user-generated content data store 350, POI data store 370, navigation data store 380, and user data store 390, for example, via network 400. For example, in some implementations, imagery may be used to generate a 3D scene, and in some implementations, the media content can be integrated with an existing 3D scene.

In accordance with the example embodiments described herein, the server computing system 300 can include one or more processors 322 and one or more memory devices 320, which were previously discussed above. The server computing system 300 may include a navigation and mapping system 330.

For example, the navigation and mapping system 330 may include an immersive view application 332 which performs functions similar to those discussed above with respect to immersive view application 132. The navigation and mapping system 330 may include a navigation application 334 which performs functions similar to those discussed above with respect to navigation application 134.

For example, the navigation and mapping system 330 may include a three-dimensional representation generator 336 which is configured to generate a 3D representation based on a plurality of images of a location (e.g., of the inside of a restaurant, of a park, etc.). The plurality of images may be captured and combined using known methods to create a 3D scene of the location. For example, a neural radiance field method can be used to generate a three-dimensional representation of a location based on a plurality of images. In some implementations, a method including a structure from a motion algorithm can be used to estimate a three-dimensional structure. In some implementations, a machine learning resource may be implemented to generate a camera-like image from any viewpoint within the location based on the captured images. For example, video flythroughs of the location may be generated by the three-dimensional representation generator 336 based on the captured images. In some implementations, the initial three-dimensional representation generated by the three-dimensional representation generator 336 may be a static 3D representation which is devoid of variable or dynamic (e.g., moving) objects. For example, the initial 3D scene of a park may include imagery of the park including imagery of trees, playground equipment, picnic tables, and the like, without imagery of humans, dogs, or other moving objects.

For example, the navigation and mapping system 330 may include a representation modification system 338 configured to integrate user-generated content from user-generated content data store 350 with three-dimensional representations obtained from the three-dimensional representation generator 336. The three-dimensional representation stored in the three-dimensional representation data store (e.g., three-dimensional representation data store 340 in FIG. 3) may also be categorized or classified according to the time of day, time of year, weather conditions, lighting conditions, etc. The three-dimensional representation generated based on the plurality of images of the location may be integrated with the media content using known methods to create the integrated three-dimensional representation of the location. For example, the representation modification system 338 may be configured to select appropriate user-generated content (e.g., of one or more dynamic objects) for a particular location at a particular time or date.

Figure 3:
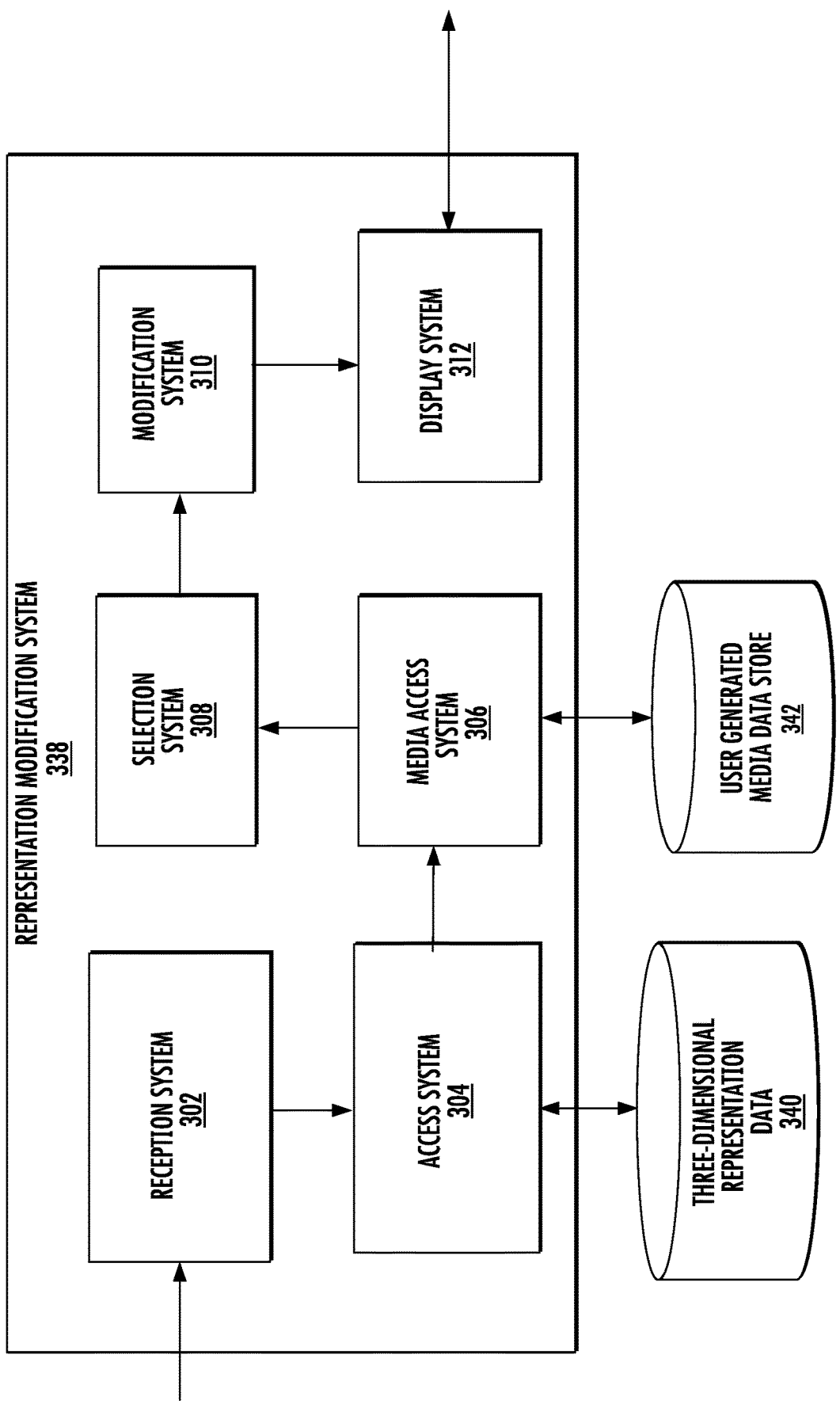
FIG. 3 represents an example system for integrating user-generated content into a three-dimensional representation of a location according to example embodiments of the present disclosure.

FIG. 3 represents an example system for integrating user-generated content into a three-dimensional representation of a location according to example embodiments of the present disclosure. The representation modification system 338 includes a reception system 302, an access system 304, a media access system 306, a selection system 308, a modification system 310, a display system 312, a three-dimensional representation data store 340, and a user-generated media data store 342.

The reception system 302 can receive a request from a user. The request can be associated with a particular location. For example, a user can interact with a mapping application to view information about a specific location. In some examples, the request information can include a three-dimensional representation of the location generated using a neural radiance field method. For example, the user can select the three-dimensional representation interface element on a particular location or building. A request can be generated based on this interaction. The request can be transmitted from a user computing device to the representation modification system 338 (or a server system associated with the representation modification system). The reception system 302 can transmit the request to the access system 304.

The access system 304 can determine a specific three-dimensional representation of a location of interest to the user based on the request. For example, the request can include information identifying a particular location, building, or entity for which a three-dimensional location is requested. The access system 304 can access the three-dimensional representation data store 340. The three-dimensional representation data store 340 can store a plurality of three-dimensional representations for a plurality of different locations. In some examples, each three-dimensional representation is associated with a particular location and is generated based on media data captured in the past. For example, a series of images captured by a photographer in a location can be used to generate a three-dimensional representation of that location using a neural radiance field method.

The access system 304 can use information from the query to determine the appropriate three-dimensional representation to retrieve from the three-dimensional representation data store 340. For example, the query can have a location identifier based on the user interaction with the navigation or mapping application. The location identifier can identify the particular location that the user is interested in viewing. In some examples, their query can also include information about the time and or date that the user is interested in. The three-dimensional representation data store 340 can include more than one three-dimensional representation for each location that represent different times, dates, or situations.

Once access system 304 has accessed the correct three-dimensional representation of the location from the three-dimensional representation data store 340, the access system 304 can transmit the selected three-dimensional representations to the media access system 306. The media access system 306 can determine appropriate user-generated media content for the selected three-dimensional representation. In some examples, the media access system 306 can determine which pieces of user-generated media content to access based on the location associated with three-dimensional representation.

A selection system 308 can determine which pieces of user-generated media content to insert into the three-dimensional representation of the location. In some examples, the selection system 308 can determine a number of pieces of user-generated media content to be inserted. The number can be based on the length of the path through the user-generated media content and the target density of pieces of user-generated media content. In some examples, the three-dimensional representation of the location includes a predetermined path through the location. For example, the predetermined path can follow the path used by the photographer who captured the initial issue images upon which the three-dimensional representation is generated. In other examples, the user can move freely through the location as target using interactive controls. In this situation, the number of pieces of user-generated media content to be inserted can be based on the total size of the area as well as the target density.

In some examples, rather than determining the total number of pieces of media content to insert, the selection system 308 can determine specific locations where media content is needed. This determination can be based on the degree to which user-generated media content will help users understand a particular area of the three-dimensional representation. For example, an area with tables and chairs can be augmented with pictures of users eating food or enjoying that area. Other areas, like a hallway to the bathroom, may not require any user-generated media content because said user-generated media content will not meaningfully improve user understanding of that location.

Once the selection system has determined one or more locations where user-generated content needs to be inserted, the selection system can determine a type of social media-generated content or the subject of user-generated content to insert. In some examples, the subject or type of user-generated media content can be determined based on location. For example, restaurants or nightclubs may be associated with a particular vibe or ambiance, and the selection system 308 can determine whether to include pieces of user-generated content associated with the specific vibe or ambiance. In other examples, the pieces of user-generated content can be selected based on the time and or date associated with the three-dimensional representation. For example, if the associated day is a holiday, the selection system 308 can select pieces of user-generated content associated with the holiday. Similarly, if the time is during daylight hours, the selection system 308 can prioritize pieces of user-generated media content associated with daytime activities.

Once the selection system 308 has determined the locations and types of content, the selection system can select the highest-rated pieces of user-generated content that meet specific criteria. For example, a third-party system can rate pieces of user content based on the degree to which they match a particular topic subject, based on user feedback such as likes or comments, or another metric. The selection system 308 can determine a metric and select the highest piece of user-generated content based on that metric. In some examples, the selection system determines a plurality of locations within the three-dimensional representation at which a piece of user-generated media content is to be inserted. The selection system 308 can select the piece of user-generated content associated with a location closest to the position at which the user-generated content will be displayed.

For example, the selection system 308 can modify the user-generated media content by cropping it, editing out details, or giving the piece of media content one or more animation effects. In some examples, a portion of an image or video can be associated with a particular subject or topic while another portion of the image is not. The selection system 308 can edit out or crop out the sections of the media content that are not associated with the subject that the selection system 308 has determined should be displayed.

Once the selection system 308 has selected one or more pieces of user-generated media content, the selected pieces of user-generated content can be transmitted to the modification system 310. The representation modification system can modify the three-dimensional representation of the location to include one or more visual pop-outs that display the selected pieces of user-generated content at predetermined locations. A visual pop-out can be a portion of the user interface that is distinct from the other portions of the three-dimensional representation. For example, the visual pop-out can be a two-dimensional image surrounded by a white border to offset it from the other portions of the three-dimensional representation. In some examples, the visual pop-out can be associated with a particular portion of the location depicted in the three-dimensional representation. For example, a visual pop-out can have a visual tail or root connecting the two-dimensional image to a particular location in the three-dimensional representation.

A visual pop-out can be a two-dimensional element (e.g., a window) of a user interface that displays user-generated media content within the three-dimensional representation. For example, the visual pop-out can include a stem that grows from a location and a white border around the piece of user-generated content that distinguishes the visual pop-out from the surrounding content. Other designs can be used to display the user-generated content within the 3D representation.

In some examples, the visual pop-outs can be selectable. Thus, when viewing the three-dimensional representations, users can select (e.g., click on or touch) the visual pop-out associated with particular user-generated media content. When a particular visual popup has been selected, the user interface can be updated to provide an enlarged or more detailed view of the user-generated media content.

Once the modification system 310 has inserted the user-generated media content into one or more visual pop-outs, the visual representation can be transmitted by the transmission system to the User computing device. In some examples, the three-dimensional representation includes the user-generated content and visual popups that can be displayed to the user.

Figure 4:
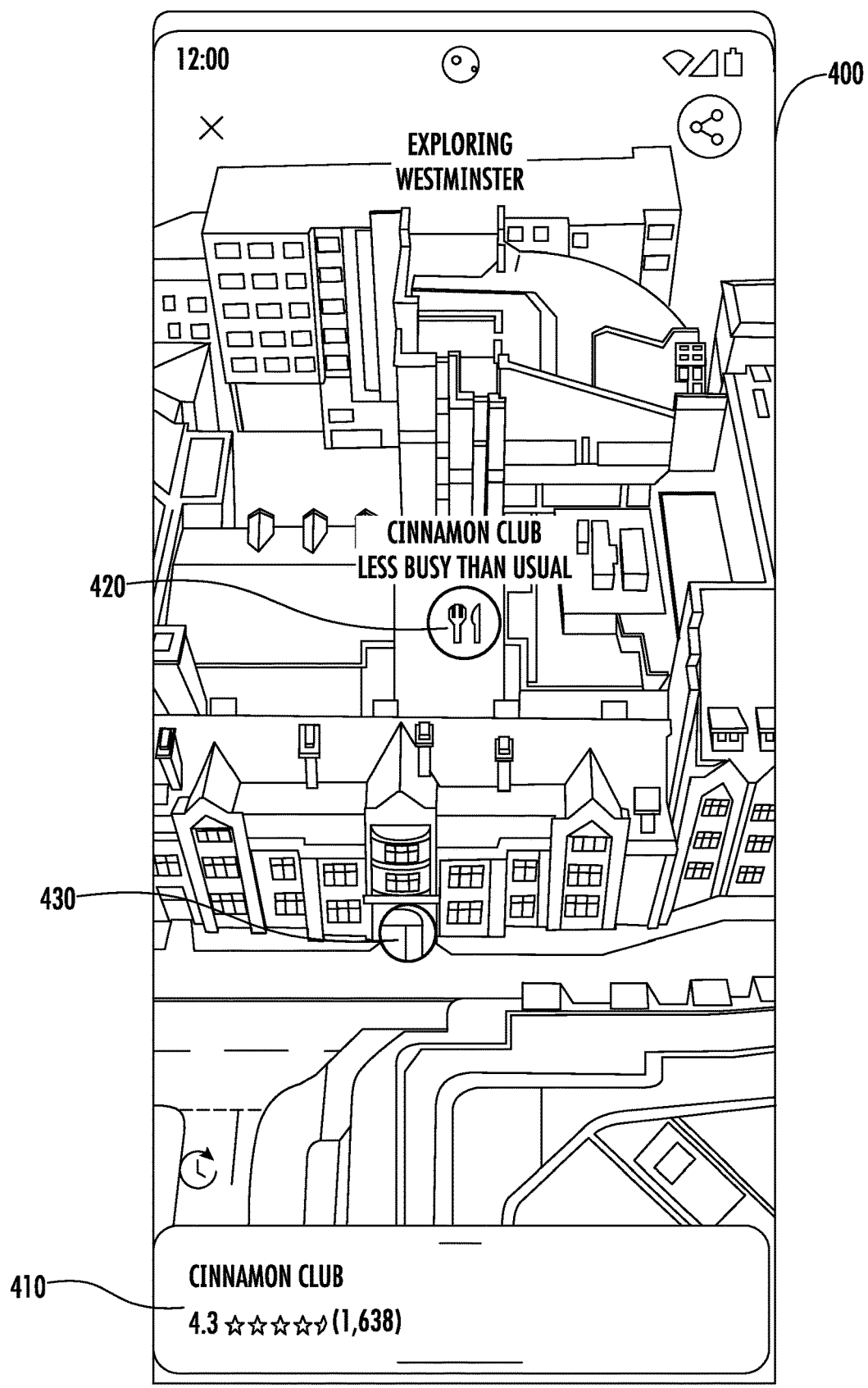
FIG. 4 illustrates a user interface screen of a mapping application, according to one or more example embodiments of the disclosure.

FIG. 4 illustrates a user interface screen of a mapping application, according to one or more example embodiments of the disclosure. In FIG. 4, user interface screen 402 indicates a user of user computing device 100 is exploring the location of Westminster, particularly a building containing the Cinnamon Club 410, where icon 420 indicates the Cinnamon Club 410 includes a restaurant. For example, a user interface element 430 may enable a user to obtain an immersive view of a location. For example, a user interface element 430 may be in the form of a symbol or selectable object overlaid on the location to indicate to the user that an immersive view of the location can be obtained. For example, in FIG. 4, the user interface element 430 is a white circle.

Figure 5A:
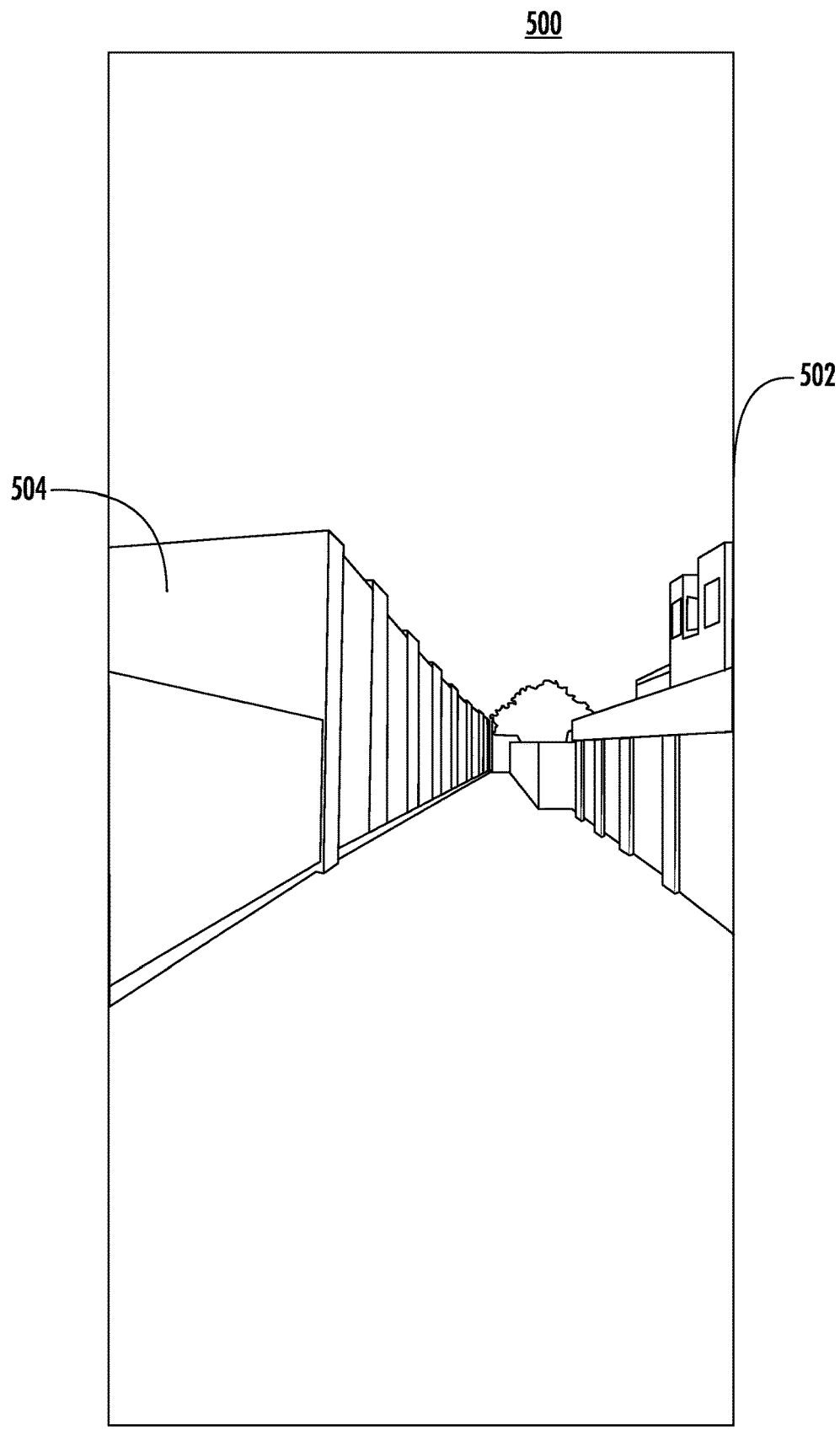
FIGS. 5A-5B illustrates an example immersive three-dimensional representation of a location, according to one or more example embodiments of the disclosure.
Figure 5B:
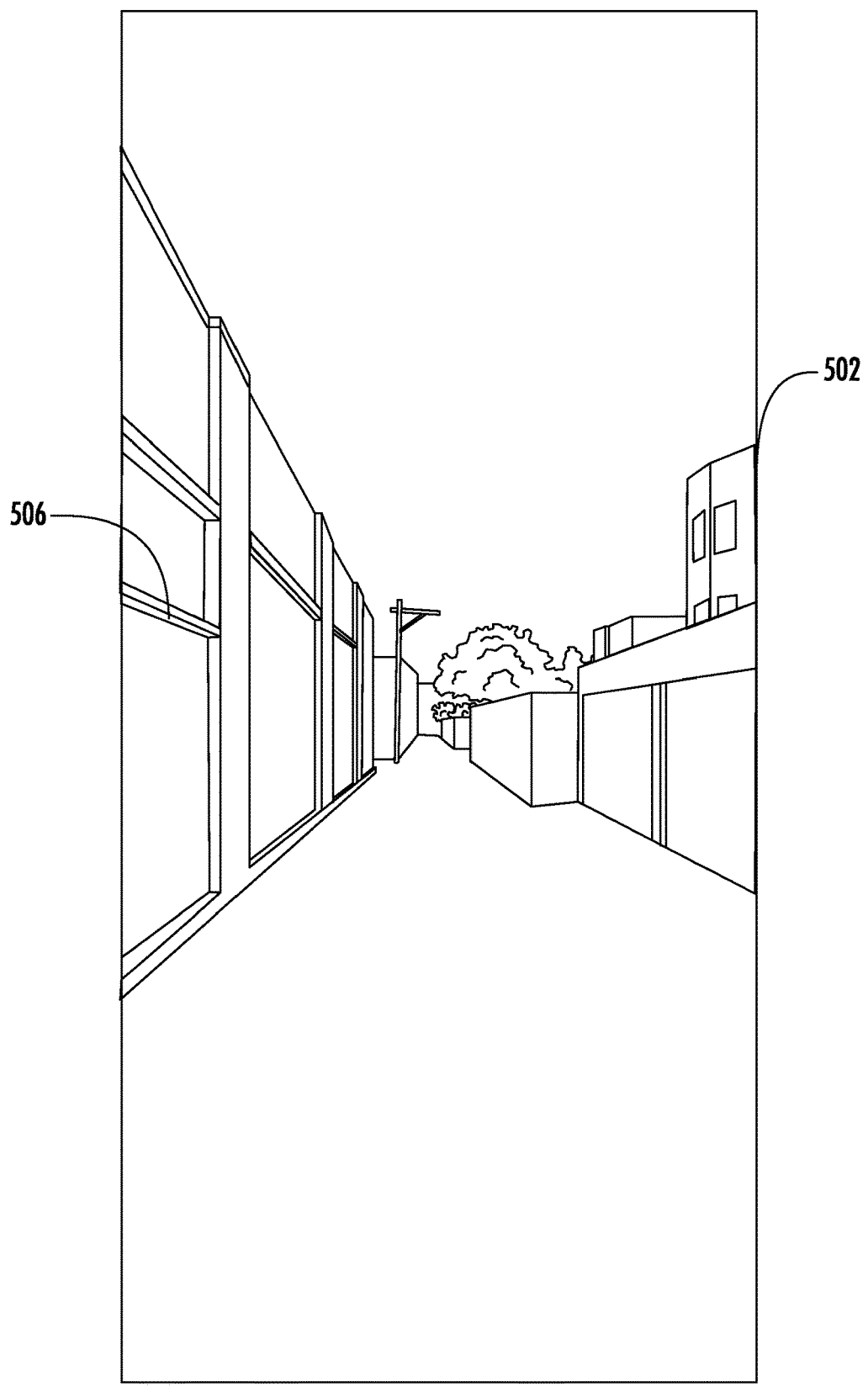

FIGS. 5A-5B illustrates an example immersive three-dimensional representation 510 of a location, according to one or more example embodiments of the disclosure. In this example, the user interface 502 displays a particular view from a particular portion of a street within the three-dimensional representation. In some examples, the three-dimensional representation includes a specific viewing object that moves through the three-dimensional location based on a predefined path. In another example, the user can use controls to dictate how the viewing object moves through the three-dimensional representation. In some examples, if a predefined path is established, it may be determined based on the path taken by the person who gathered images that are used to generate the three-dimensional representation, using, for example, a neural radiance field method.

In some examples, the user interface can start at the view depicted in FIG. 5A (504) and move without any discontinuity to a second view. In this way, the viewing object can move cleanly and without interruption through the space, and the quality and type of views available remain at the same level of quality and fidelity.

FIG. 5B represents a second snapshot of a view 506 available in the three-dimensional representation of location. For example, the user has controlled the viewing object to move from a position that results in the views depicted in FIG. 5A to a position that results in the view depicted in FIG. 5B 506. Although not depicted, there are plurality of views between the views shown in FIG. 5A and FIG. 5B as the viewing object moves along the path that is either predefined or defined by the user's input.

Figure 6A:
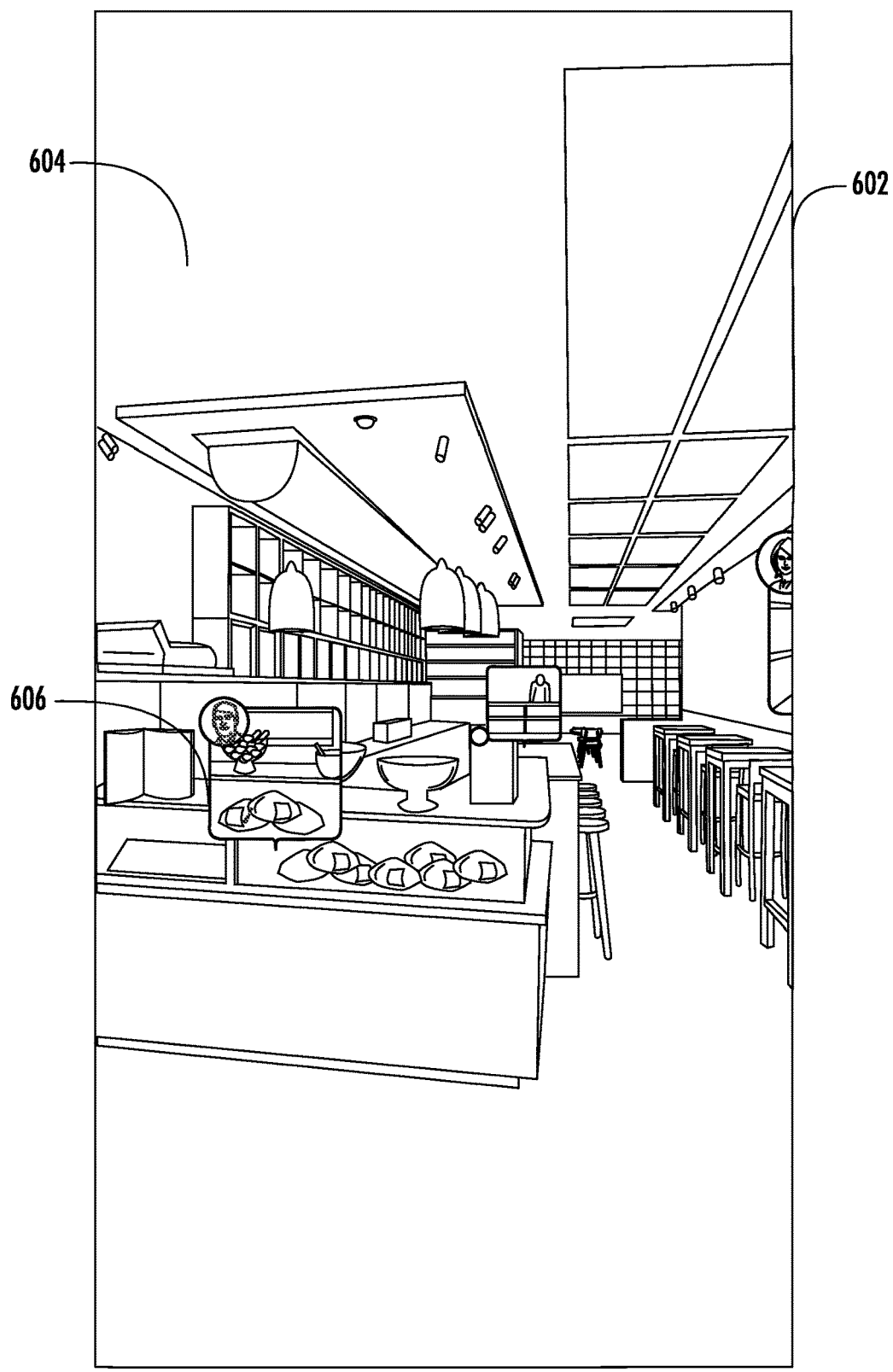
FIGS. 6A-6C illustrate an example immersive three-dimensional representation of a location with inserted visual pop-outs, according to one or more example embodiments of the disclosure.
Figure 6B:
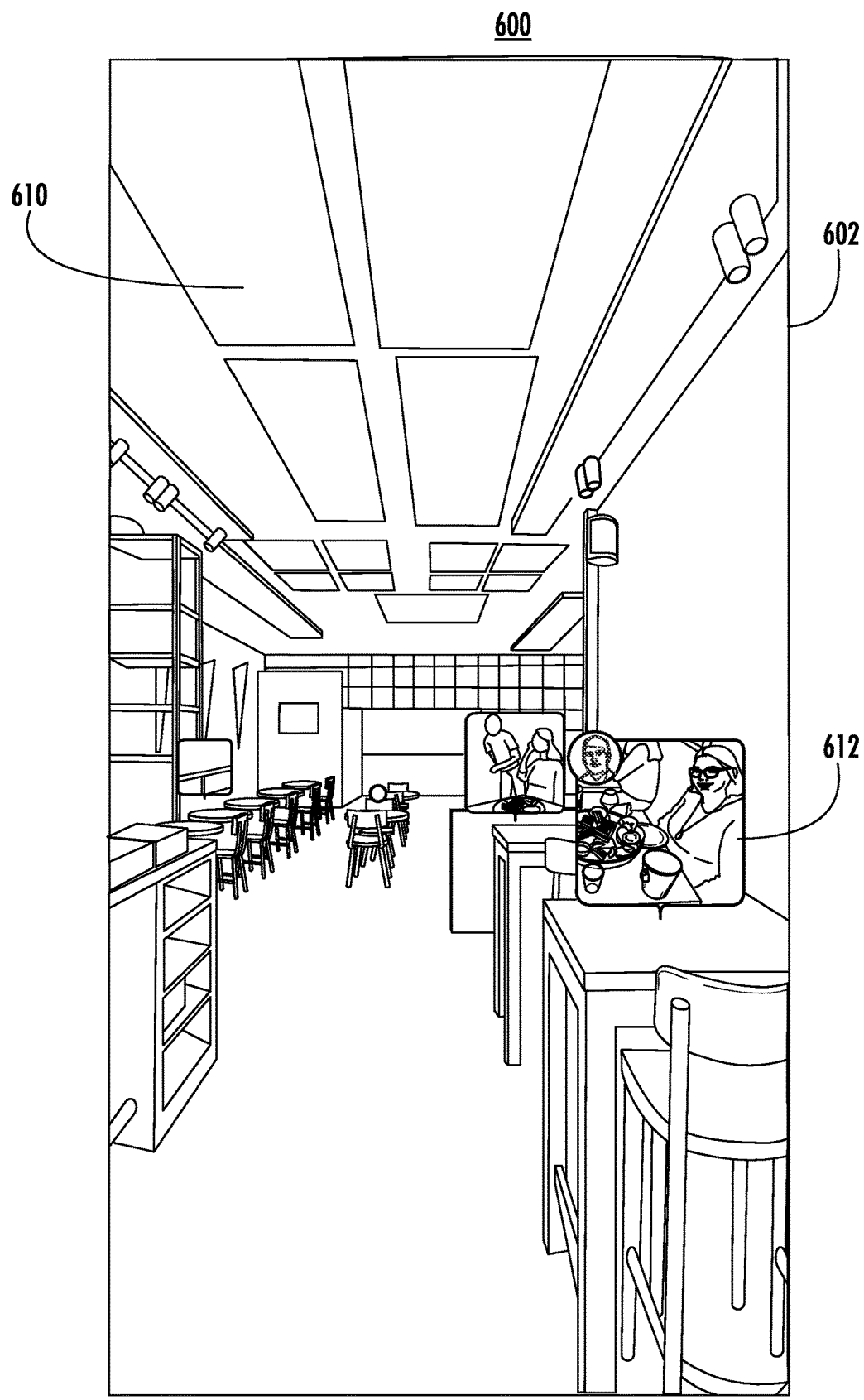
Figure 6C:

FIGS. 6A-6C illustrate an example immersive three-dimensional representation of a location 600 with inserted visual pop-outs, according to one or more example embodiments of the disclosure. FIG. 6A shows a user interface 602 that displays an initial viewpoint 604 of the three-dimensional representation, including the permanent parts of the location (e.g., no moveable aspects such as people) and the plurality of visual pop-outs. For example, visual pop-out 606 is a visual pop-out providing additional context for the location, including the dynamic (e.g., non-permanent) aspects of the location. The dynamic features aspects can include people, services such as food, and other aspects of the mood or vibe of the location. The visual pop-outs, including the visual pop-out 606, can display user-generated media content made available to the representation modification system (e.g., representation modification system 338 in FIG. 3) that generates the three-dimensional representations of location. For example, users who generate this content may designate particular pieces of user-generated media content to be usable when generating three-dimensional representations.

FIG. 6B represents a second viewpoint 610 of the three-dimensional representation. To reach the viewpoint displayed in FIG. 6B from the viewpoint displayed in FIG. 6A, the camera or viewing object has moved along a path in which the 3D representation is always clear and viewable. In some examples, the path from the position of viewing object in FIG. 6A to the position of the viewing object in FIG. 6B is predefined in the three-dimensional representation. For example, the three-dimensional representation can be generated with one or more fixed or predetermined paths through the three-dimensional representation. In other examples, the user can control the position of the viewing object or camera to move to any point within the 3D representation.

FIG. 6B also includes several additional visual pop-outs. As can be seen, some of the visual pop-outs, including visual pop-out 612, include user-generated media content positioned near the location where the user-generated media content was captured. For example, visual pop-out 612 depicts a woman sitting at a table with food, and the visual pop-out 612 is positioned near the table at which the woman is pictured in the visual media content. In some examples, the specific user-generated media content depicted in each pop-out can be determined by location, subject, and overall quality rating.

FIG. 6C displays a piece of user-generated media content 622 displayed in an updated interface 620 when selected by a user in accordance with one or more example embodiments of the disclosure. In some examples, a user can interact with the specific piece of user-generated content displayed in a visual pop-out. For example, the user can tap or otherwise select a particular visual pop-out. In response, the user interface can be updated to display the piece of user-generated media content displayed in the visual pop-out in a larger format or with more detail. For example, the user has selected or interacted with the user-generated content in visual pop-out (e.g., visual pop-out 612 displayed in 6B). As a result, the user interface 620 has been updated to display the piece of user-generated content in a larger format for closer inspection. In some examples, the user-generated content displayed in the visual pop-out may be edited or cropped to fit the format of the visual pop-out. In that case, the selection of the visual pop-out may result in the entire piece of user-generated content being displayed.

Figure 7A:
FIG. 7A displays an example of a three-dimensional representation of the location in which user-generated media content has been seamlessly integrated in accordance with some implementations of the current disclosure.

FIG. 7A displays an example of a three-dimensional representation 700 of the location in which user-generated media content has been seamlessly integrated in accordance with some implementations of the current disclosure. In this example, the three-dimensional representation includes a non-permanent part of the location. For example, the three-dimensional representation is displayed in a user interface 702 of an application. The displayed portion of the three-dimensional representation includes a bartender. To achieve this effect, the representation modification system (e.g., representation modification system 338 in FIG. 3) can identify a particular piece of user-generated content associated with a particular location and a particular subject theme or vibe target to be represented in the three-dimensional representation. In this example, the vibe may be that the workers at this location are friendly, cool, and helpful.

As can be seen, the piece of user-generated media content is not inserted in the visual pop-out but is instead seamlessly inserted into the three-dimensional representation of the location. In some examples, a particular piece of user-generated media content is only inserted with the permission of the user depicted and the user who generated the piece of user-generated media content. In some examples, the seamlessly integrated piece of user-generated media content may only be displayed from a particular angle or along a particular route through the three-dimensional user-generated content because there is not enough information in the piece of user-generated content to generate a fully three-dimensional representation of the user-generated content reliably.

Figure 7B:
FIG. 7B displays a piece of user-generated media content used to generate the 3D representation in accordance with some implementations of the current disclosure.

FIG. 7B displays a piece of user-generated media content 720 used to generate the 3D representation, as seen in FIG. 7A. In this example, the user-generated media content is an image of a bartender at a bar in the location associated with the 3-dimensional representation depicted in FIG. 7A. As can be seen, the image is a single image and thus may not be appropriate to integrate fully into three-dimensional representation as a fully realized three-dimensional model. Instead, the piece of user-generated media content can be integrated such that from a particular angle and along a particular route, the effect is seamless, but such a seamless integration may not be possible from all potential locations within the three-dimensional representation. Thus, when a user selects a 3D representation of a location to view, the system can determine a particular path the user will travel along and determine whether any user-generated media content is eligible for integration into the three-dimensional representation. If so, the system can determine whether the piece of user-generated media content would adequately be integrated into the scene along the route for the user.

If so, the representation modification system can modify the three-dimensional representation to include the user piece of user-generated media content such that it appears to be a seamless portion of the three-dimensional representation while the user is traveling along the predetermined path. In some examples, there is enough data in the user-generated piece of media content (or several pieces of user-generated media contact, to fully integrate the user-generated media content into the three-dimensional representation sensor that can be viewed from all potential angles and along all potential paths.

Figure 8:
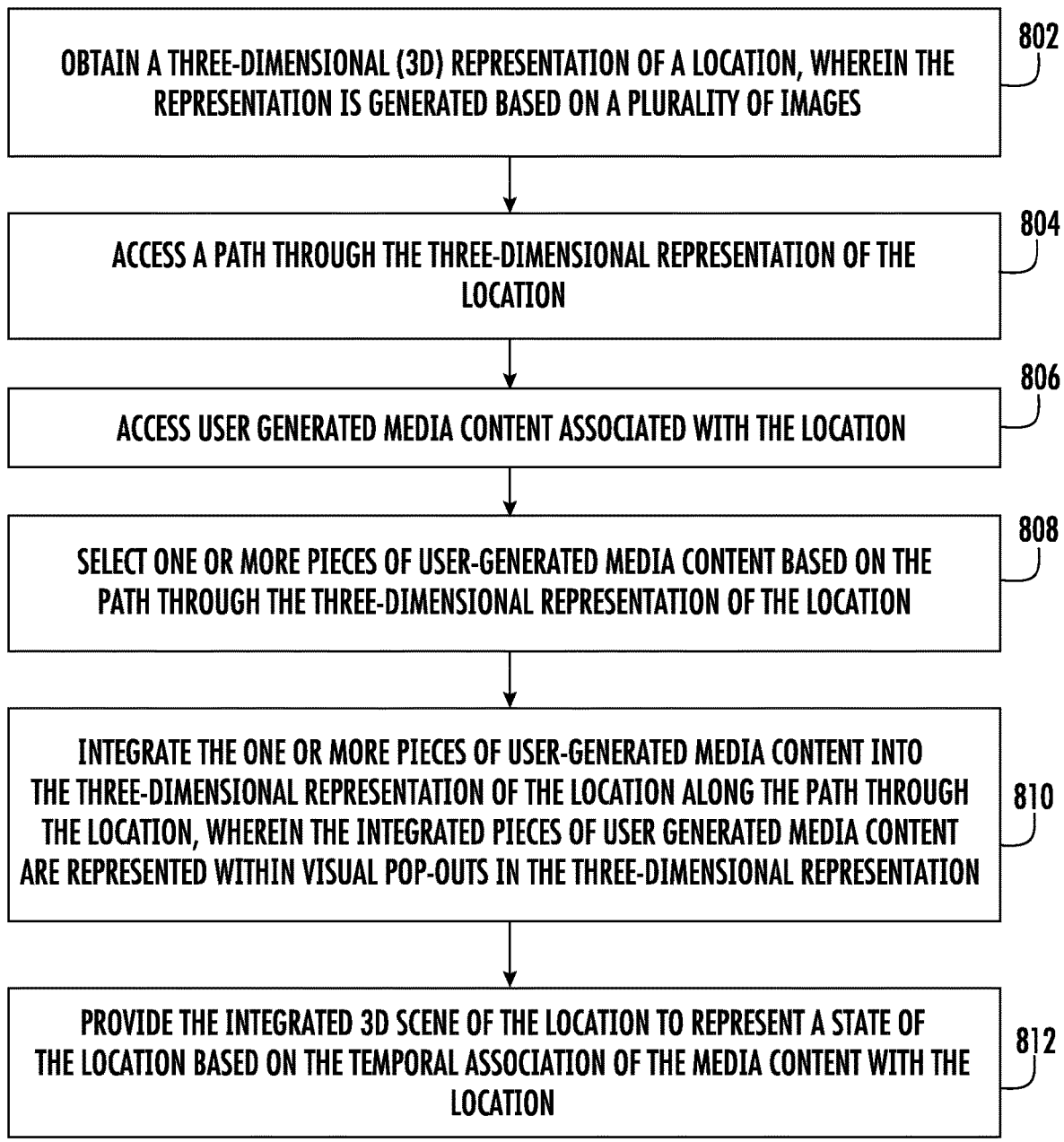
FIG. 8 depicts an example flow diagram for a method of integrating user-generated media content into three-dimensional representations of locations according to example embodiments of the present disclosure.

FIG. 8 depicts an example flow diagram for a method of integrating user-generated media content into three-dimensional representations of locations according to example embodiments of the present disclosure. One or more portion (s) of the method can be implemented by one or more computing devices such as, for example, the computing devices described herein. Moreover, one or more portion(s) of the method can be implemented as an algorithm on the hardware components of the device(s) described herein. FIG. 8 depicts elements performed in a particular order for illustration and discussion purposes. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1, 2, and 3.

A computing system (e.g., user computing device 102 in FIG. 1) can include one or more processors, memory, and one or more communication systems. The one or more communication systems allow the computing system to transmit data to other computing systems via a communication network. The user computing device 102 (e.g., user computing device 102 in FIG. 1) can include other components that, together, enable the user computing device 102 (e.g., user computing device 102 in FIG. 1) to, at 802, obtain a three-dimensional representation of a location, wherein the representation is generated based on a plurality of images. In some examples, the three-dimensional representation can be a virtual representation of a physical location.

The virtual representation can include a virtual camera that simulates a person moving through the space. The virtual camera can have a location and an orientation. The portion of the three-dimensional representation captured by the virtual camera (e.g., based on its location and orientation) can be displayed to a user viewing the three-dimensional representation of the location. The virtual camera (or other viewing mechanism) can be moved through the three-dimensional representation and the portion of the three-dimensional representation that is displayed can seamlessly transition as the virtual camera moves. The movement of the virtual camera can be based on a path or path information.

The representation modification system can, at 804, access user-generated media content associated with the location. The media content comprises user-generated media content captured by one or more users. In some examples, the user-generated media content comprises at least one user-generated visual content, user-generated audio content, or user-generated textual content. In some examples, users can make media content available to the representation modification system for use in augmented three-dimensional representations of locations. The representation modification system can, as a policy, only access user-generated media content that has explicitly been made available for use in this way by the users who created it.

The representation modification system can, at 806, receive path information representing at least a portion of a path through the three-dimensional representation of the location. In some examples, the path information can be received by based on a path of a user as they navigate through the three-dimensional representation of the location. For example, a user can walk through a location while periodically capturing images of the location. The three-dimensional representation of a location can be generated by accessing the series of two-dimensional images of the location, wherein the images are captured by a camera (held by a user) moving through space and periodically capturing one or more two-dimensional images. The representation generation system can provide the series of images to a machine-learned model trained to generate the three-dimensional representation as output.

In some examples, the received path information can be generated based on the path of the camera moving through the space to capture one or more two-dimensional images and provided to the representation modification system. The path information can be pre-generated to follow the path of the user who captured the series of two-dimensional images that were used to generate the three-dimensional representation of the location. In some examples, the user will take multiple, distinct paths through the location while capturing two-dimensional images. The three-dimensional representation can be traversed through any of the multiple predetermined paths through the three-dimensional representation based on the paths of the user who captured the images.

In some examples, the path information is generated based on input from a user to navigate a virtual camera through the three-dimensional representation of the location to seamlessly view different portions of the three-dimensional representation. For example, a user viewing the three-dimensional representation of a location can be provided with controls (e.g., touch input controls or other controls) that allow the user to indicate a direction to move the virtual camera (e.g., forward, back, left, right, and so on). In this way the user can determine a path through the three-dimensional representation of the location in real-time as desired. Each input from the user can be provided to the representation modification system as path information.

The one or more pieces of user-generated media content includes imagery of the location including one or more real-world dynamic objects. For example, the images can include users, moveable or non-permanent objects, services offered at the location (e.g., food, drinks, or other services), temporary decorations or conditions, time specific features of a location, and so on.

The representation modification system can, at 808, select one or more pieces of user-generated media content based on the path through the three-dimensional representation of the location. In some examples, the representation modification system can determine one or more categories of content to be displayed in the three-dimensional representation. The representation modification system can select one or more pieces of user-generated media based on one or more categories of content.

The representation modification system can determine a target density of pop-out images along the path through the environment. The representation modification system can select a number of images based on the length of the path and the target density. In some examples, the representation modification system can determine an associated location within the three-dimensional representation for each candidate image in a plurality of candidate images.

In some examples, the representation modification system can receive content ratings for each candidate image. In some examples, the representation modification system can determine that a pop-out is to be displayed at a respective position within the three-dimensional representation of the location. The representation modification system can select an image for the respective position from the candidate images based on the location associated with each candidate image and the rating for each candidate image. In some examples, the pieces of user media content are selected based, at least in part, on the time associated with the piece of user media.

In some examples, the representation modification system can, at 810, integrate one or more pieces of user-generated media content into the three-dimensional representation of the location along the path through the location, wherein the integrated pieces of user-generated media content are represented within visual pop-outs in the three-dimensional representation.

In some examples, the representation modification system can, at 812, provide the integrated 3D scene of the location to represent a state of the location based on the temporal association of the media content with the location.

To the extent alleged generic terms including "module", and "unit," and the like are used herein, these terms may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

While the disclosure has been described with respect to various example embodiments, each example is provided by way of explanation, not limitation of the disclosure. Those skilled in the art, upon attaining an understanding of the foregoing, can readily produce alterations to, variations of, and equivalents to such embodiments. Accordingly, the disclosure does not preclude inclusion of such modifications, variations and/or additions to the disclosed subject matter as would be readily apparent to one of ordinary skill in the art. For example, features illustrated or described as part of one embodiment can be used with another embodiment to yield a still further embodiment. Thus, it is intended that the disclosure covers such alterations, variations, and equivalents.

What is claimed is:

1. A computer-implemented method, comprising:
    obtaining a three-dimensional model representing a geographic location, wherein the three-dimensional model is generated by a machine-learned model based on a series of two-dimensional images of the geographic location that have been previously captured by a camera following one or more paths through the geographic location;
    accessing user-generated media content associated with the geographic location;
    receiving path information representing at least a portion of a path through the three-dimensional model representing the geographic location, wherein the path information is generated based on a path of the camera as it was previously moved through the geographic location to capture ordered series of two-dimensional images of the location for use in generating the three-dimensional model;
    selecting one or more pieces of user-generated media content based, at least in part, on the path information;
    modifying the three-dimensional model representing the geographic location to include the one or more pieces of user-generated media content based on the path information and a portion of the three-dimensional model to be displayed to a user, wherein the pieces of user-generated media content are presented within one or more visual pop-outs in the three-dimensional model; and
    providing the three-dimensional model representing the geographic location for display to a user.

2. The computer-implemented method of claim 1, wherein the user-generated media content is captured by one or more users.

3. The computer-implemented method of claim 2, wherein the user-generated media content comprises at least one of user-generated visual content, user-generated audio content, and user-generated textual content.

4. The computer-implemented method of claim 1, wherein the three-dimensional model is generated by:
    accessing the series of two-dimensional images, wherein the two-dimensional images were captured by a camera moving through the location and periodically capturing one or more two dimensional images of the location in a particular order; and
    providing the series of images to a machine-learned model trained to generate the three-dimensional model as output.

5. The computer-implemented method of claim 1, wherein one or more pieces of user-generated media content include imagery of the location including one or more real-world dynamic objects.

6. The computer-implemented method of claim 1, wherein selecting one or more pieces of user-generated media content based on the path information further comprises:
    determining one or more categories of content to be displayed in the three-dimensional model; and
    selecting the one or more pieces of user-generated media content based on the one or more categories of content.

7. The computer-implemented method of claim 1, wherein selecting one or more pieces of user-generated media content based on the path information further comprises:
    determining a target density of visual pop-outs within the three-dimensional model representing the geographic location; and
    selecting a number of images based on the portion of the three-dimensional model representing the geographic location to be displayed to a user.

8. The computer-implemented method of claim 1, wherein selecting one or more pieces of user-generated media content based on the path information further comprises:
    determining that a visual popout is to be displayed at a respective position within the three-dimensional model representing the geographic location;
    determining, for each candidate piece of user-generated media content in a plurality of candidate pieces of user-generated media content, an associated location within the three-dimensional model;
    receiving content ratings for each candidate piece of user-generated media content, and
    selecting a piece of user-generated media content for the respective position from the candidate pieces of user-generated media content based on the location associated with each candidate piece of user-generated media content and the rating for each candidate piece of user-generated media content.

9. The computer-implemented method of claim 8, wherein the pieces of user-generated media content are selected based, at least in part, on a temporal association of the user-generated media content with the location.

10. The computer-implemented method of claim 9, wherein the pieces of user-generated media content are selected based, at least in part, on a time-of-day associated with the piece of user-generated media content.

11. The computer-implemented method of claim 9, wherein the pieces of user-generated media content are selected based, at least in part, on a date associated with the piece of user-generated media content.

12. The computer-implemented method of claim 8, further comprising:
   accessing user preference data, wherein the pieces of user-generated media content are selected based, at least in part, on the user preference.

13. The computer-implemented method of claim 8, wherein each respective piece of user-generated media content in the plurality of pieces of user-generated media content has an associated media perspective and selecting a piece of user-generated media content for the respective position from the candidate pieces of user-generated media content based on the location associated with each candidate piece of user-generated media content and the rating for each piece of user-generated media content image further comprises:
   determining a user perspective associated with a portion of the three-dimensional model representing the geographic location to be displayed; and
   selecting the one or more pieces of user-generated media content based, at least in part, on the associated media perspective for each respective piece of user-generated media content and the user perspective associated with the portion of the three-dimensional model representing the geographic location to be displayed.

14. The computer-implemented method of claim 8, further comprising:
   determining that a semantic label associated with the respective position within the three-dimensional model representing the geographic location; and
   selecting the piece of user-generated media content for the respective position from the candidate pieces of user-generated media content based, at least in part, on the semantic label associated with the respective position within the three-dimensional model representing the geographic location.

15. The computer-implemented method of claim 1, further comprising:
   while displaying a portion of the three-dimensional model representing the geographic location to the user:
      receiving user input indicating selection of a piece of user-generated media content displayed in a visual pop-out; and
      updating a user-interface to display the selected piece of user-generated media content in greater detail.

16. The computer-implemented method of claim 1, further comprising:
   while displaying a portion of the three-dimensional model of the location to the user, wherein the displayed portion is determined based on a position and direction of a virtual camera within the three-dimensional model representing the geographic location:
      receiving user input indicating a selection of a piece of user-generated media content displayed in a visual pop-out; and
      updating the direction of the virtual camera within the three-dimensional model representing the geographic location to provide additional detail of the selected piece of user-generated media content within a user interface.

17. A computing device, comprising:
   an input device;
   a display device;
   at least one memory to store instructions; and
   at least one processor configured to execute the instructions to perform operations, the operations comprising:
      obtaining a three-dimensional model representing a geographic location, wherein the three-dimensional model is generated by a machine-learned model based on a series of two-dimensional images of the geographic location that have been previously captured by a camera following one or more paths through the geographic location;
      accessing user-generated media content associated with the geographic location;
      receiving path information representing at least a portion of a path through the three-dimensional model representing the geographic location, wherein the path information is generated based on a path of the camera as it was previously moved through the geographic location to capture ordered series of two-dimensional images of the location for use in generating the three-dimensional model;
      selecting one or more pieces of user-generated media content based, at least in part, on the path information;
      modifying the three-dimensional model representing the geographic location to include the one or more pieces of user-generated media content based on the path information and a portion of the three-dimensional representation to be displayed to a user, wherein the pieces of user-generated media content are presented within one or more visual pop-outs in the three-dimensional model; and
      providing the three-dimensional model representing the geographic location for display to a user.

18. One or more non-transitory computer-readable media that collectively store instructions that, when executed by one or more computing devices, cause the one or more computing devices to perform operations, the operations comprising:
   obtaining a three-dimensional model representing a geographic location, wherein the three-dimensional model is generated by a machine-learned model based on a series of two-dimensional images of the geographic location that have been previously captured by a camera following one or more paths through the geographic location;
   accessing user-generated media content associated with the geographic location;
   receiving path information representing at least a portion of a path through the three-dimensional model representing the geographic location, wherein the path information is generated based on a path of the camera as it was previously moved through the geographic location to capture ordered series of two-dimensional images of the location for use in generating the three-dimensional model;
   selecting one or more pieces of user-generated media content based, at least in part, on the path information;

modifying the three-dimensional model representing the geographic location to include the one or more pieces of user-generated media content based on the path information and a portion of the three-dimensional model to be displayed to a user, wherein the pieces of user-generated media content are presented within one or more visual pop-outs in the three-dimensional model; and providing the three-dimensional model representing the geographic location for display to a user.

* * * * *